US006883077B2

(12) United States Patent
Kimura et al.

(10) Patent No.: US 6,883,077 B2
(45) Date of Patent: Apr. 19, 2005

(54) CACHE CONTROL DEVICE AND METHOD WITH TLB SEARCH BEFORE KEY RECEIPT

(75) Inventors: Hiroaki Kimura, Kawasaki (JP); Yuji Shirahige, Kawasaki (JP); Iwao Yamazaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 126 days.

(21) Appl. No.: 10/083,161

(22) Filed: Feb. 27, 2002

(65) Prior Publication Data

US 2003/0084254 A1 May 1, 2003

(30) Foreign Application Priority Data

Oct. 25, 2001 (JP) ........................................ 2001-328022

(51) Int. Cl.$^7$ .............................................. G06F 12/14
(52) U.S. Cl. ..................... 711/164; 711/145; 711/163; 711/204; 711/205; 711/206; 711/207; 711/213; 711/239
(58) Field of Search .............................. 711/3, 113, 145, 711/152, 163, 164, 203, 204, 205, 206, 207, 213; 712/239; 713/200, 202

(56) References Cited

U.S. PATENT DOCUMENTS 5,450,563 A * 9/1995 Gregor .......................... 711/3
5,603,008 A * 2/1997 Hilton et al. ................ 711/164
5,737,575 A * 4/1998 Blaner ......................... 711/164

FOREIGN PATENT DOCUMENTS

| JP | 62026551 A | * 2/1987 |
| JP | A-2-285440 | 11/1990 |
| JP | 02285440 A | * 11/1990 |

* cited by examiner

Primary Examiner—B. James Peikari
(74) Attorney, Agent, or Firm—Staas & Halsey LLP

(57) ABSTRACT

In an information processsing unit with key controlled protection, since it takes a long time to fetch a storage key from key storage, an instruction and computation unit of a CPU receives data from a memory control unit of the CPU before a key is received, and then the transferred storage key is checked.

10 Claims, 20 Drawing Sheets

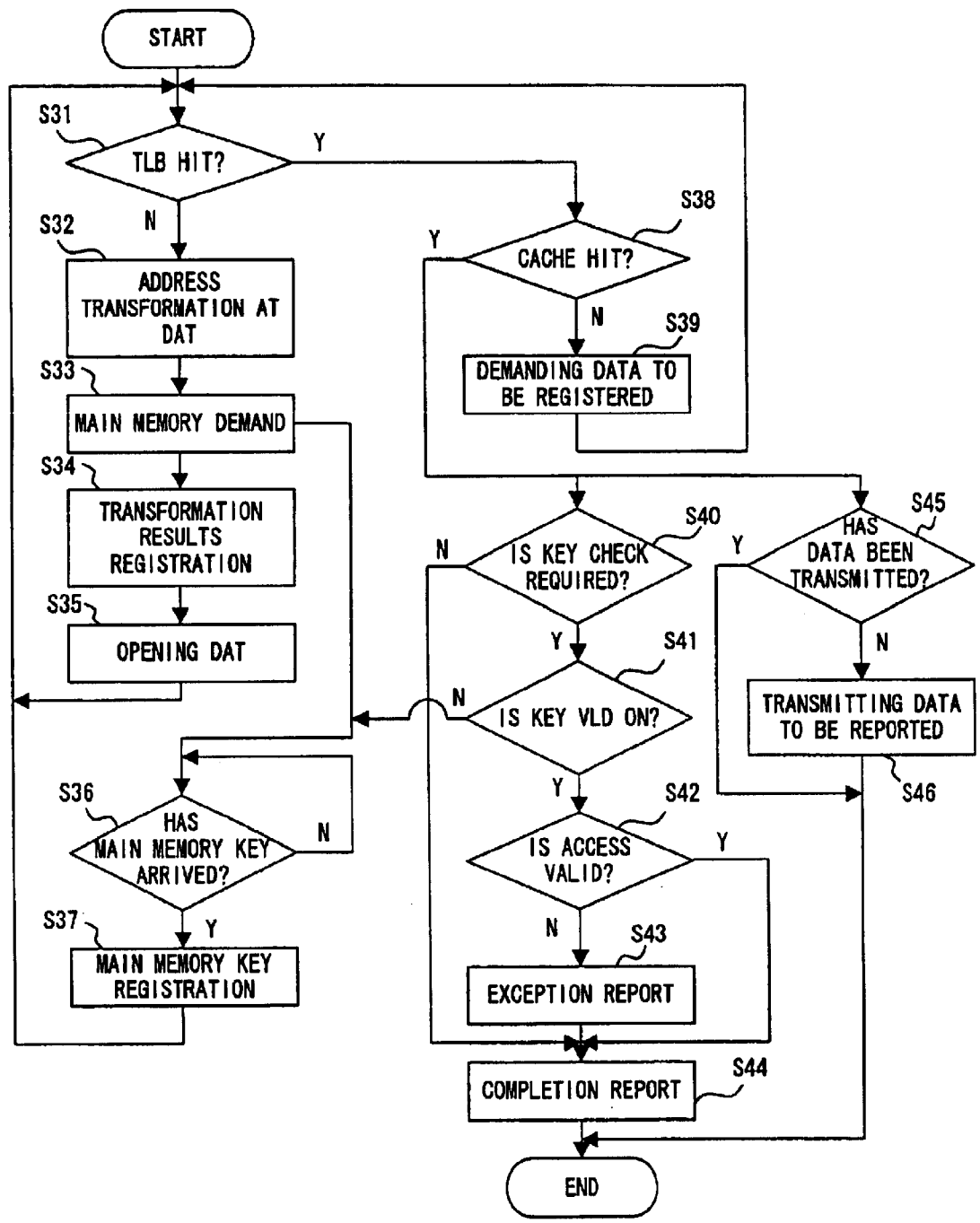
F I G. 5

CACHE CONTROL DEVICE AND METHOD WITH TLB SEARCH BEFORE KEY RECEIPT

BACKGROUND OF THE INVENTION

1. Field of the Invention

The present invention relates to a computer system provided with key control protection by a storage key. More particularly, it relates to a cache control device for controlling the operations of the cache, and a method thereof.

2. Description of the Related Art

A storage key is information for protecting the contents of a main storage of an information processing device from an improper access, and the key is created for each page of the main storage. This storage key consists of, for example, an access control bit (four bits), a fetch protection bit, a reference bit, and a change bit.

FIG. 1A is a block diagram showing a conventional information processing unit that has a storage key. The information processing unit of FIG. 1A includes a CPU (Central Processing Unit) instruction computation unit 31, a CPU memory unit 32, a main storage 33, and a key storage 41. The CPU memory unit 32 includes two caches 34, a control device 35, a main memory access validity detection circuit 36, two TLBs (Translation Lookaside Buffers) 37, two key buffers 38, a DAT (Dynamic Address Translation) 39, and a key access port 40.

TLB 37 is provided to speed up address translation, and a correspondence relation between a logical address and a physical address is registered or stored in TLB 37. The key buffer 38 is provided to speed up a key access, and a storage key is registered or stored in the key buffer 38. Here, the key accessing process demands or request a storage key stored in the key storage 41, thereby obtaining the key. Further, the cache 34 is provided to speed up a main memory access, thereby storing data faster.

One of the two caches 34 stores instructions as data, while the other stores operands as data. Regarding TLBs 37 and key buffers 38, one is used for instructions, while the other is used for operands. DAT 39 transforms an assigned logical address into a physical address.

The validity detection circuit 36 checks the validity of the main memory access, using a storage key registered in the key buffer 38 and an access key transmitted from the CPU instruction computation unit 31. The Key access port 40 stores a storage key transmitted from the key storage 41, and transfers it to the key buffer 38.

FIG. 1B is a timing chart of the cache control in the information processing unit of FIG. 1A. FIG. 1C is a flowchart showing the outline of the cache control. When a main memory access demand (request) is issued from the CPU instruction computation unit 31, a determination is made as to whether the physical address that is a translation result of the logical address associated with the demand is registered or stored in TLB 37 (hit or miss) (step S11).

When the physical address is not registered, TLB 37 reports a TLB miss to the control device 35, and then the control device 35 demands address translation from DAT 39(step S12). After the address translation process is carried out by DAT 39, the control device 35 demands or requests a storage key from the key storage 41 (step S13), and waits for a key arrival report (step S13).

When the storage key arrives at the key access port 40, this arrival triggers the registration or storage of a physical address that is the translation result of DAT 39. In TLB 37, and also the registration of a storage key of the key access port 40, in the key buffer 38 (step S15). Then, DAT 39 is released (step S16).

Then, the control device 35 resumes the process for a main memory access demand or access request. Since the physical address is registered in TLB 37, TLB 37 reports a TLB hit to the control device 35, and the control device 35 retrieves the cache 34 using this physical address output by TLB 37. In this way, it is determined whether data (instruction or operand) is stored or registered (hit or miss) in the cache 34 (step S17).

If data is not registered or stored, a data demand or request is issued to the main storage 33, and the arrived data is registered in the cache 34 (step S18). Then, the process for the main memory access demand is resumed. If data is registered, the cache 34 transmits the data, and reports a cache hit to the control device 35.

The CPU instruction computation unit 31 determines in advance whether a main memory access demand requires protection (key control protection) using a storage key, and it transmits the demand that differs according to the determination result to the CPU memory unit 32. Then, the CPU memory unit 32 determines whether a key check is required by the validity detection circuit 36 on the basis of a type of the demand (step S19). At the same time as the TLB hit, a validity detection circuit 36 reads out a storage key that is registered or stored in the key buffer 38, and it checks the validity of the access by comparing this key with an access key received from the CPU instruction computation unit 31 (step S20).

Specifically, when key control protection is not required, the CPU instruction computation unit 31 transmits to the CPU memory unit 32, a signal INH_KEY_CHECK for disregarding the check result of the validity detection circuit 36. The CPU memory unit 32 is configured to disregard the check result when this signal is on (logic value 1).

If the main memory access demand or access results in a cache hit, and the validity of access is admitted or acknowledged, data is transmitted to the CPU instruction computation unit 31 (step S21). The control device 35 transmits a data transfer report and a completion report to the CPU instruction computation unit 31, and completes the main memory access process. At this time, the result of the check or check result of the validity detection circuit 36 is transmitted to the CPU instruction computation unit 31 as a key protection exception signal. If the key protection exception signal is off (logic value 0) when the completion report is transmitted, the transmitted data comes into effect or is to be used.

If the validity of access is not admitted or acknowledged at step S20, the key protection exception signal becomes on, an exception report is transmitted to the CPU instruction computation unit 31 (step S22).

However, the above-mentioned conventional cache control has the following problems.

During conventional control, a main memory access is executed via a main memory access demand or request that requires key control protection, the validity of the access is checked for the obtained data, and the checked data is transmitted after the validity of access is admitted or acknowledged. Because of this, when a key access is required for the main storage, the device should wait for the arrival of the storage key, so that it takes a long time to transmit data.

Further, the arrival of the storage key that is required for the main storage at a key access port triggers the registration or storage of the translation results obtained by DAT, in the TLB, and also the release of DAT. Because of this, neither the registration of the translation results nor the release of the DAT can be executed, even if DAT completes an address translation process.

In the main memory access demand that does not require key control protection, the validity check of access is not basically required. In spite of this, when a TLB miss occurs for such a demand, a key access is executed with the main storage, and data is checked by using the arrived storage key, thereby transmitting data. Therefore, a useless waiting time occurs.

SUMMARY OF THE INVENTION

The object of the present invention is to provide a cache control device for improving the performance of a data access in an information processing unit that is provided with key control protection by a storage key, and a method thereof.

The cache control device of the present invention is provided with a demand device, a control device, and a transfer device and a cache stores data.

The demand device demands a storage key, and the control device starts the retrieval of data of the cache without waiting for the arrival of the demanded storage key. Then, the transfer device transmits the retrieved data.

BRIEF DESCRIPTION OF THE DRAWINGS

FIG. 5 is a flowchart of cache control;

DESCRIPTION OF THE PREFERRED EMBODIMENTS

The preferred embodiments of the present invention are explained in detail with reference to the drawings.

Figure 2A:
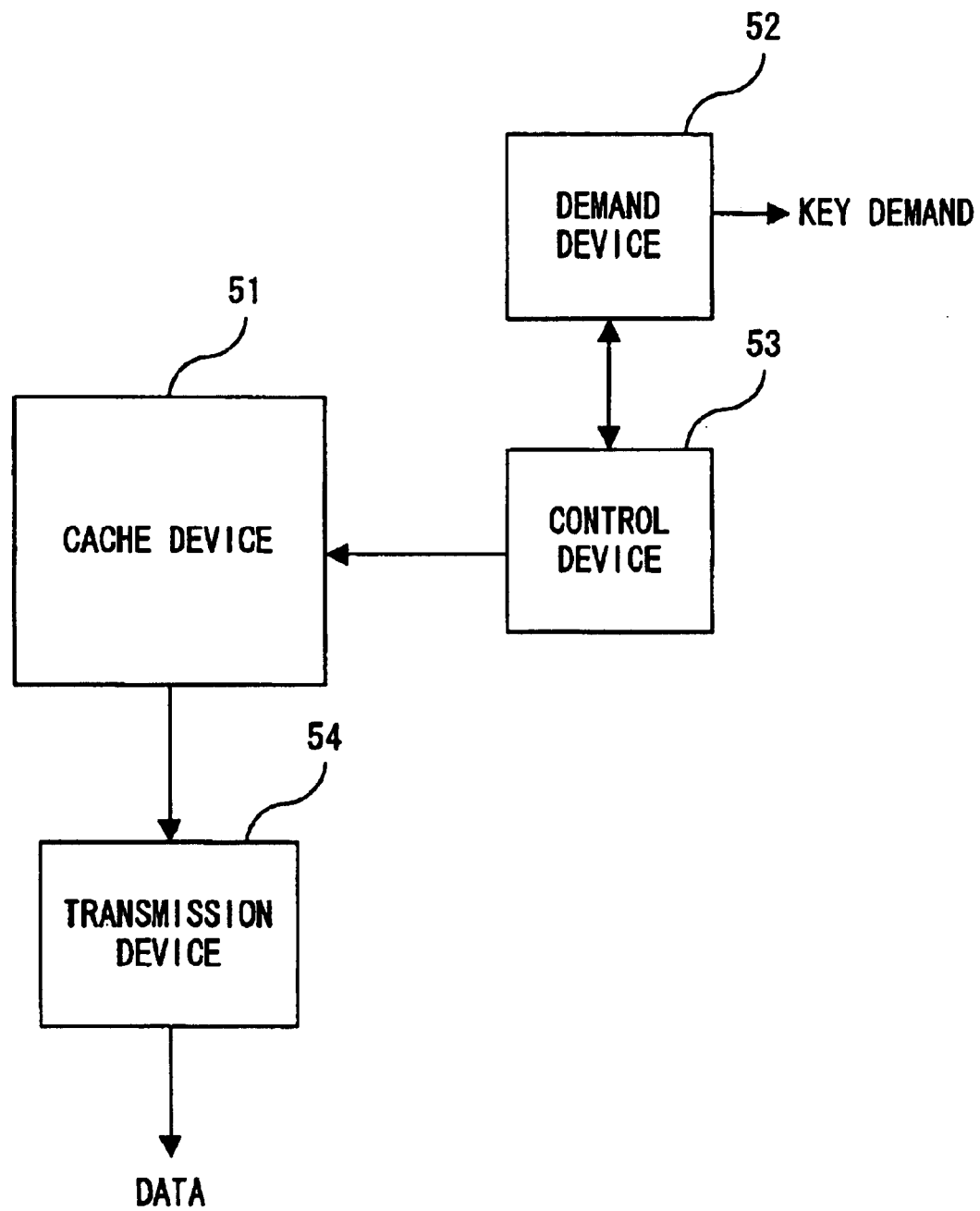
FIG. 2A is a block diagram showing the principle of a cache control device of the present invention.

FIG. 2A is a block diagram of the cache control device of the present invention. The cache control device of FIG. 2A is provided with a cache 51, a demand device 52, a control device 53, and a transfer device 54.

The cache device 51 stores data, the demand device 52 demands a storage key, and the control device 53 starts the retrieval of data of the cache device 51, without waiting for the arrival of the demanded storage key. Then, the transfer device 54 transmits the retrieved data.

When a TLB retrieval is performed for a data access demand or request and a storage key is required by the TLB miss, the demand device 52 issues a key demand or request for a storage unit of the storage key in a similar manner that for to the key storage 41, and demands or requests the corresponding storage key. When the storage key is demanded, the control device 53 starts the retrieval of the cache 51, by retrieving TLB again before the arrival of the demanded storage key. Then, the transfer device 54 immediately transmits the retrieved data to a source of the data access demand or request.

With such an arrangement, the process of a main memory access demand or request can be resumed, without waiting for the completion of a validity check executed using the arrived storage key, when a key access is required for the main storage. Thus, the process time of a demand or access request for main memory access can be shortened. Further, the transfer device 54 can transmit the retrieved data, without waiting for the arrival of the requested storage key. Accordingly, the time required for the issuance of a main memory access demand for a data transfer can be shortened.

The cache 51 of FIG. 2A corresponds to, for example, the cache 34 of FIG. 2B, which is described later herein. The demand device 52 and the control device 53 of FIG. 2A correspond to, for example, a control device 61 of FIG. 2B. The transfer device 54 of FIG. 2A corresponds to, for example, an AND gate 84 of FIG. 6, which is also described later.

The following are the characteristics of the cache control device of the present embodiment.

(1) The validity check for a main memory access and a cache access are separated, and data are processed before the validity check. Specifically, when a key access is required for the main storage, a CPU memory unit is controlled to transmit data, without waiting for the arrival of a storage key at a key access port and the validity check. In this way, the time required for the issuance of a main memory access demand or request for the transfer of data can be shortened.

(2) When a TLB miss of a main memory access occurs, address translation at DAT is required, and the requirement of a storage key for the main storage is treated as a trigger for the registration of the result of address translation by DAT in TLB. In this way, the time required from the start of address translation to the TLB registration can be shortened, thereby retrieving from the TLB again without waiting for the arrival of the storage key. That is, the process of a main memory access demand can be resumed without waiting for a key access.

(3) After the result of address translation by DAT is registered or stored in TLB, the DAT is released without waiting for the registration of a storage key, and the successive address translation demands are processed. In this case, the demand of a storage key for the main storage is treated as a trigger to release DAT. In this way, DAT is immediately released, and the successive address translation processes are performed without waiting for the arrival of the storage key after the address translation is executed.

(4) A main memory access process is completed without waiting for a key access and a validity check executed for a main memory access demand that does not require key control protection. In this case, the data and completion report are immediately transmitted, if the demanded data exists in the cache even if a TLB miss occurs. Then, the storage key arriving from the main storage is registered or stored in a key buffer. Therefore, the lime between the issuance of a main memory access demand and that of a completion report can be shortened.

(5) Since the successive demands should be waited or held until the key access port becomes vacant by performing the above-mentioned control (3), key accesses cannot continuously be executed when a plurality of storage key demands continuously occur. Thereupon, a plurality of key access ports are provided and a plurality of key accesses can be simultaneously executed, so that the release of the DAT can efficiently be executed. In this way, since the address translation by DAT is continuously carried out and a corresponding storage key can be demanded or requested each time the translation completes, the key demand for the main storage is continuously issued. Accordingly, the DAT works efficiently.

Figure 1A:
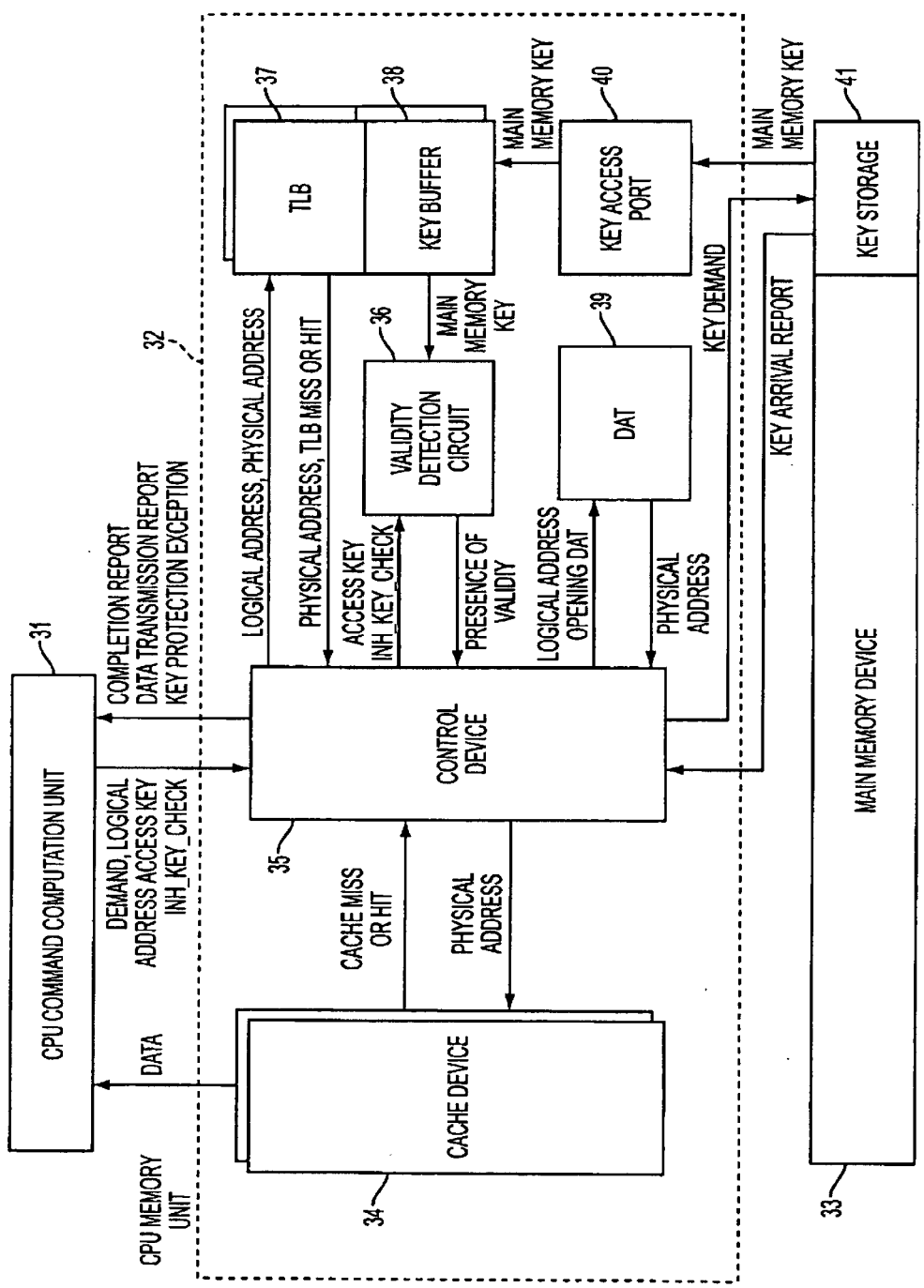
FIG. 1A is a block diagram showing the constitution of a conventional information processing unit.
Figure 1B:
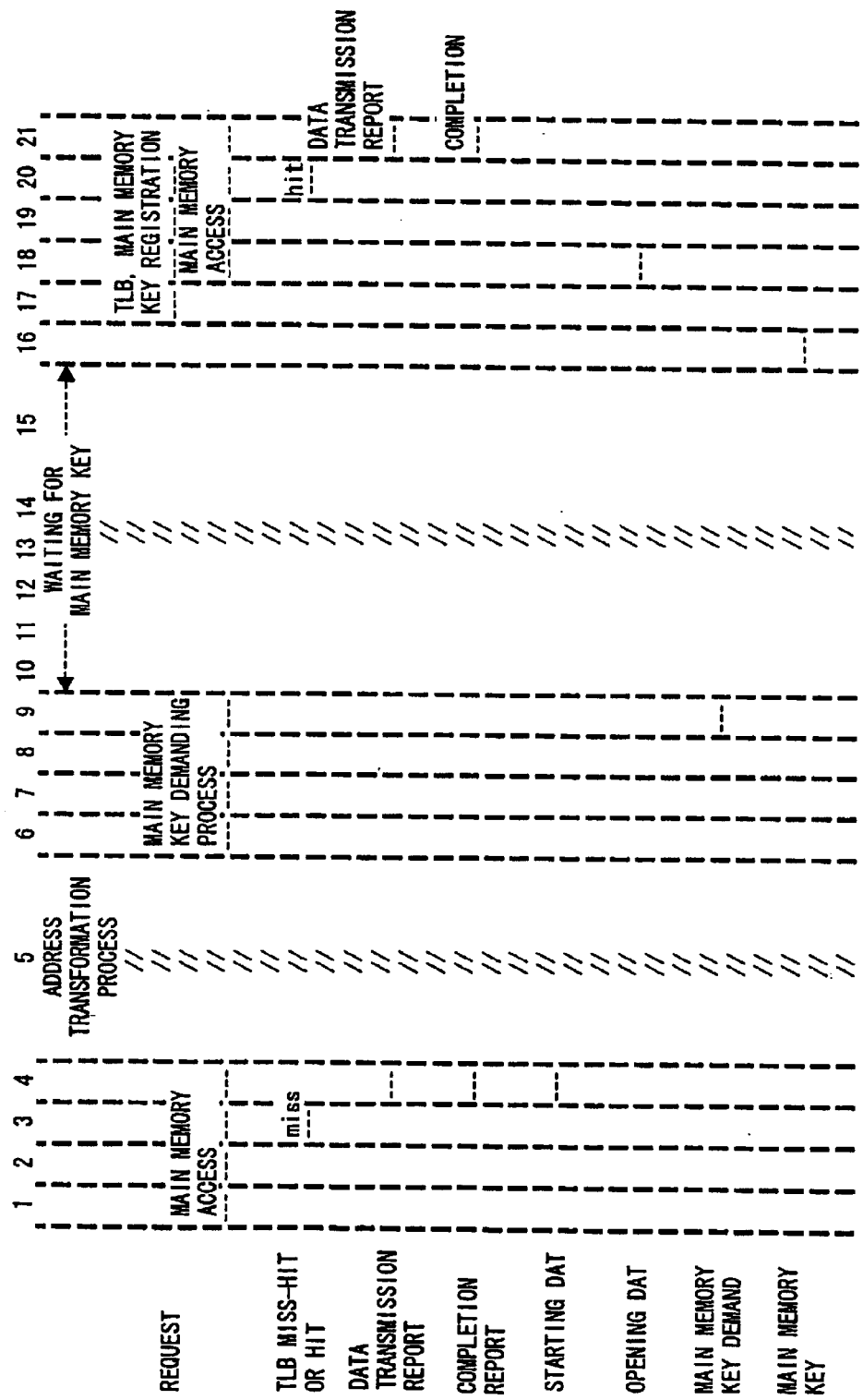
FIG. 1B is a timing chart of conventional cache control.
Figure 1C:
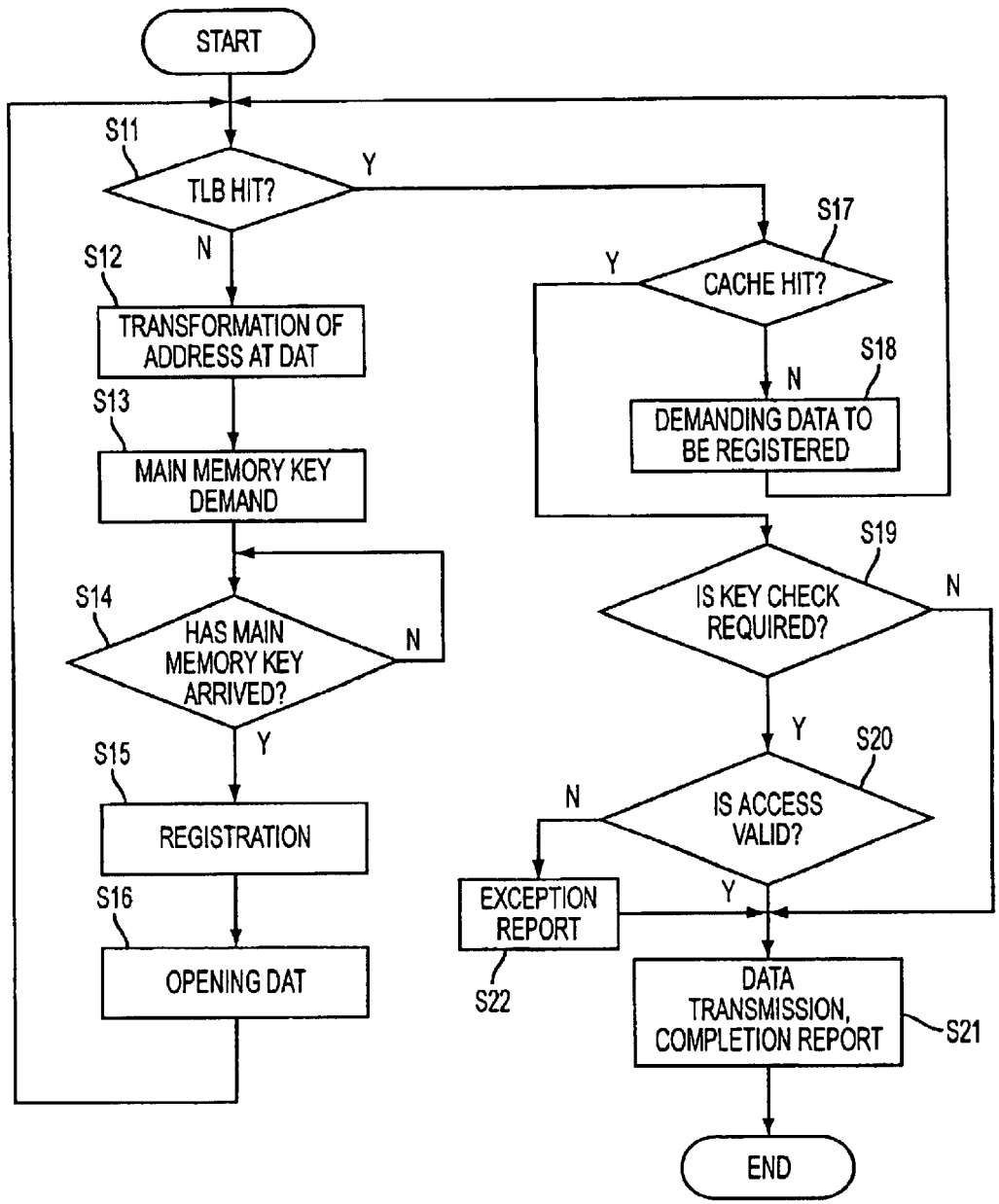
FIG. 1C is a flowchart of conventional cache control.
Figure 2B:
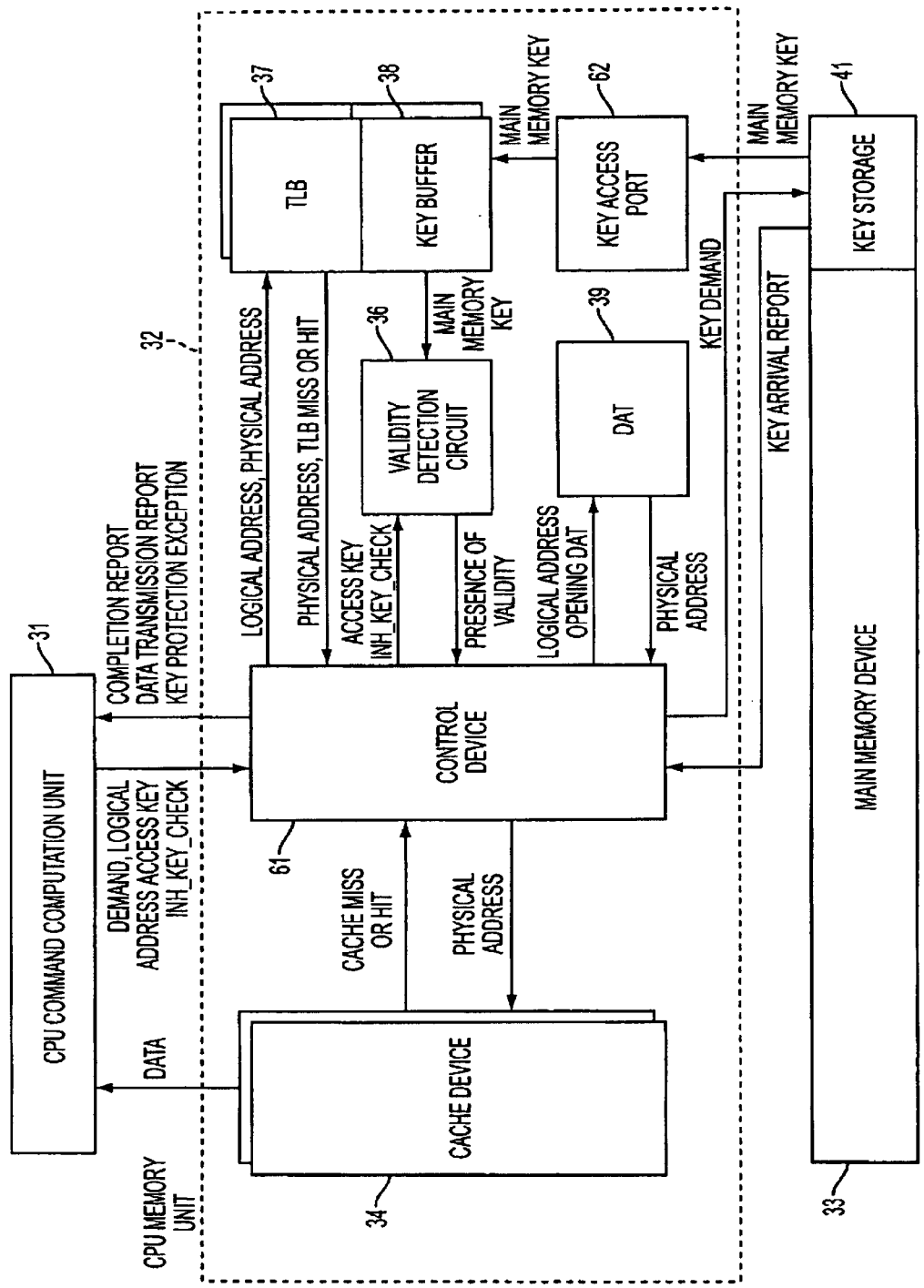
FIG. 2B is a block diagram showing the constitution of an information processing unit.

FIG. 2B is a block diagram showing the configuration of an information processing unit equipped with a cache control device of the present invention. In FIG. 2B, the same item number shown in FIG. 1A indicates the identical or corresponding function, with respect to the element of the same number as shown FIG. 1A. As mentioned above, the control device 61 performs control to make a data access of the CPU instruction computation unit 31 efficient, and two key access ports 62 are provided.

Figure 3:
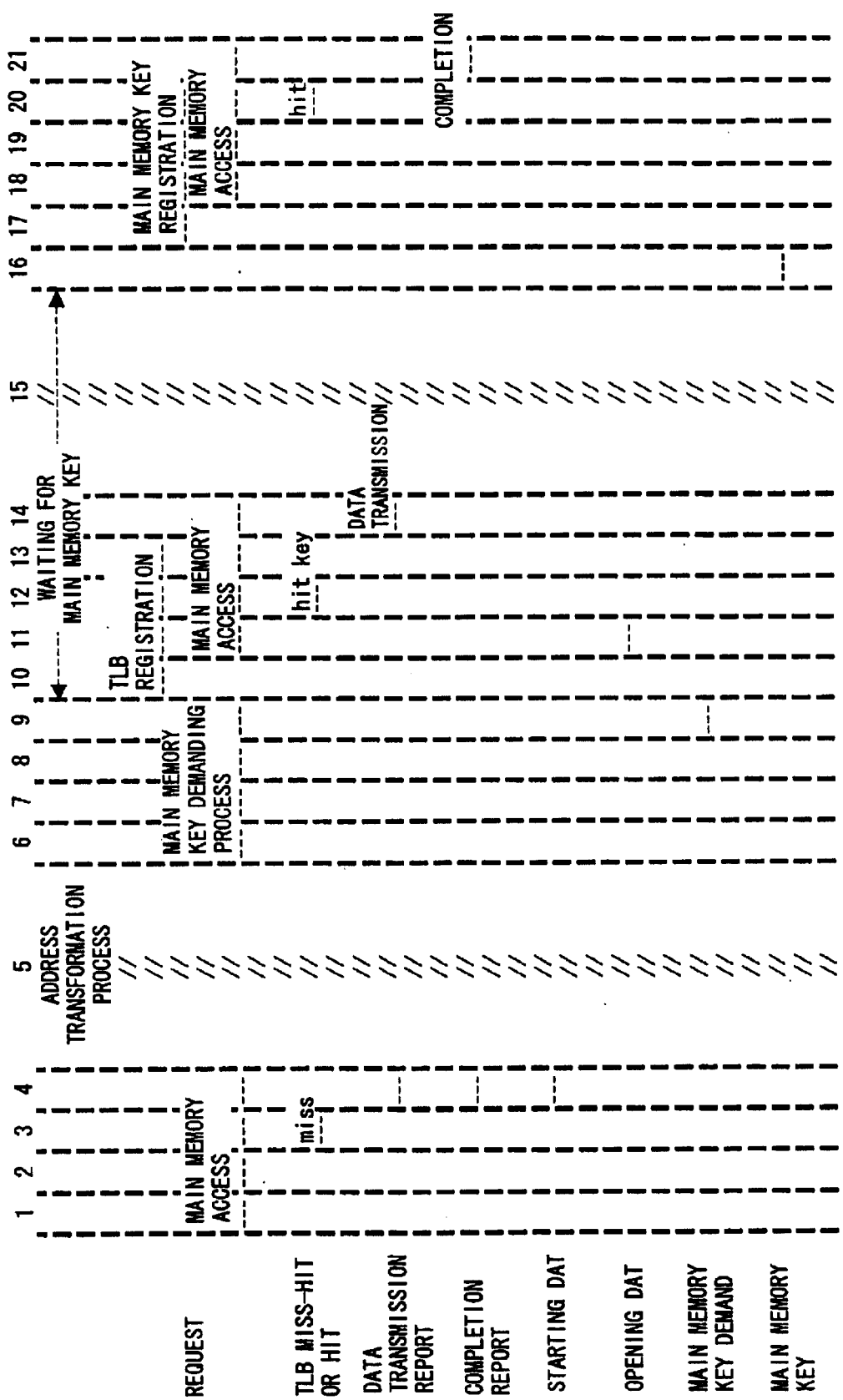
FIG. 3 is the first timing chart of the cache control.
Figure 4:
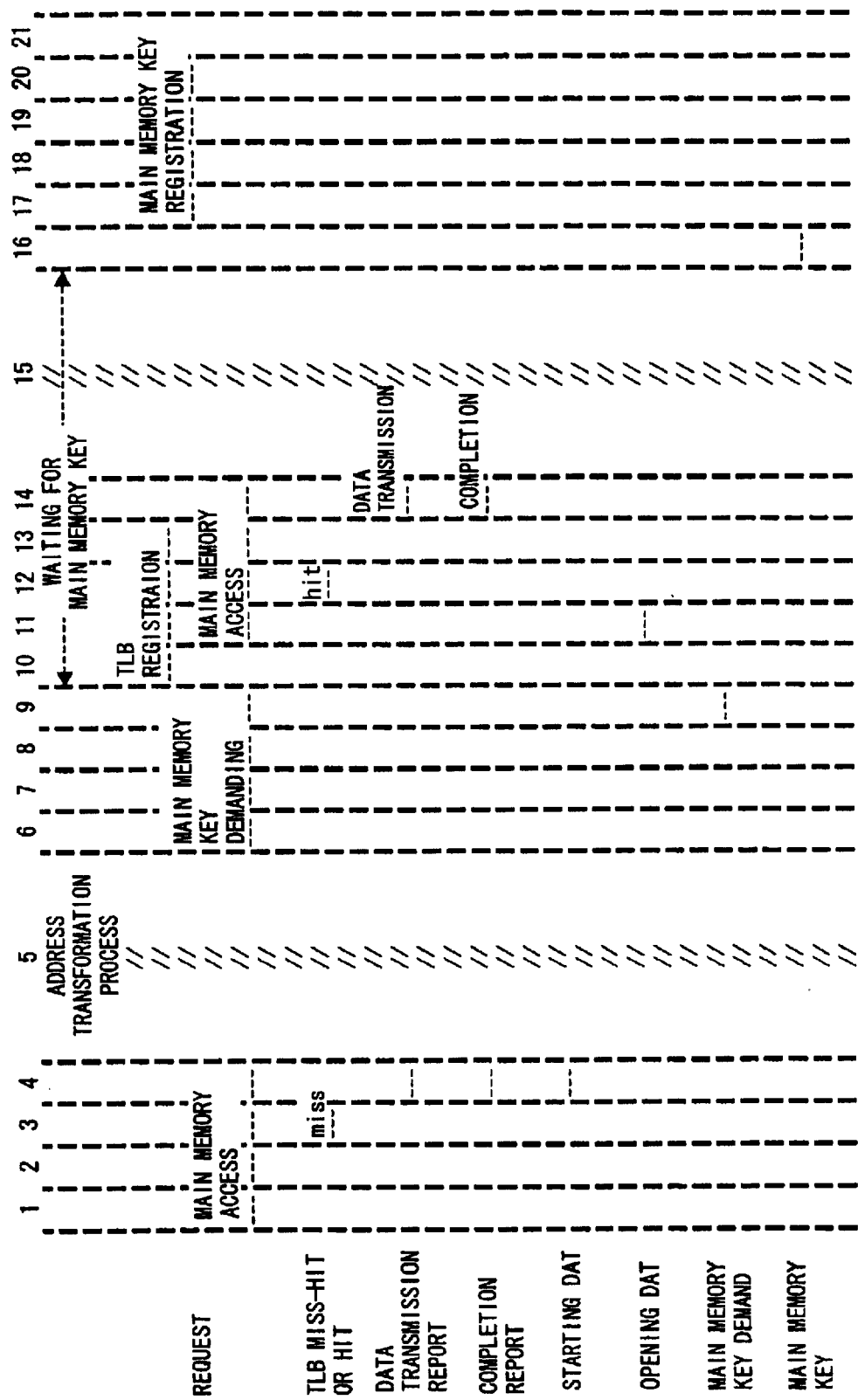
FIG. 4 is the second timing chart of the cache control.

Each of FIGS. 3 and 4 shows a timing chart of the cache control in the information processing unit of FIG. 2B. FIG. 5 shows a flowchart indicating the outline of the cache control. A timing chart of FIG. 3 corresponds to the case where key control protection is required, while a timing chart of FIG. 4 corresponds to the case where key control protection is not required.

First, a main memory access demand or request is issued from the CPU instruction computation unit 31, and a logical address associated with the demand is delivered to a control device 61. The control device 61 accesses TLB 37 in order to check whether the physical address that is a translation result of the logical address is registered or stored in TLB 37 (step S31). If the physical address is registered in TLB 37, TLB 37 reports a TLB hit to the control device 61.

If the physical address is not registered, the TLB 37 reports a TLB miss to the control device 61, and the control device 61 demands address translation from DAT 39 (step S32). Following this, DAT 39 starts address translation of the logical address. When the address translation process completes, the logical address and physical address are stored in a register provided inside the control device 61.

Further, the control device 61 issues a storage key demand or request to the key storage 41 (step S36), and waits for a key arrival report (step S33). Furthermore, this storage key demand is treated or used as a trigger for the issuance of a demand or request for registration of a physical address that is a translation result of DAT 39 (TLB registration demand) in TLB 37 (step S34), and for the registration of the translation result in TLB 37, thereby releasing DAT 39 (step S35).

Next, making the TLB registration demand as a trigger, the control device 61 resumes the process of the main memory access demand, and accesses TLB 37 again using the logical address stored in the CPU memory unit 32. Since the translation result is registered in TLB 37 at this time, TLB 37 reports a TLB hit to the control device 61. The control device 61 that receives a report of a TLB hit retrieves the cache 34 using the thus-hit physical address (step S38).

If the demanded data is not registered in the cache 34A, a data demand is issued to the main storage 33, and the received data is registered in the cache 34 (step S39). If data is registered, it is checked whether a key check by the validity detection circuit 36 is required (whether key control protection is required) (step 40), and it is also checked whether data has been transmitted (step S45).

If the key check is required, it is determined whether a validity signal VLD of the key buffer 38 is on (step S41). If the signal VLD is off, the storage key has not arrived, and accordingly the arrival is waited for (step S36).

If data has not been transmitted, the cache 34 transmits data to the CPU instruction computation unit 31, and it reports a cache hit to the control device 61 (step S46). The control device 61 that receives the report of a cache hit transmits a data transfer report to the CPU instruction computation unit 31.

Then, a storage key is delivered to a key access port 62 from the main storage 33. Thereupon, using the arrival as a trigger, the control device 61 issues a demand of registering a storage key in the key buffer 38 (KEY registration demand), and a storage key of the key access port 62 is registered in the key buffer 38(step S37). In this way, VLD of the key buffer 38 becomes on.

At this time, the logical address and physical address that are registered in TLB 37, and the storage key should correspond. Thereupon, the control device 61 overwrites in TLB 37, the logical address and physical address that are stored in a register inside the control device 61 at the same time as the registration or storage of the storage key.

As shown in FIG. 3, the registration of the storage key triggers the start of the process for the main memory access demand in the CPU memory unit 32. In a manner similar to the above-mentioned procedure, a TLB hit and a cache hit occur. In this case, since VLD is on, the key buffer 38 is accessed, the registered storage key is read out, and the validity of the access is checked by the validity detection circuit 36 (step S42).

If the validity of access is not admitted or acknowledged as a result of the key check executed by the validity detection circuit 36, the control device 61 turns a key protection exception signal on, transmits an exception report to the CPU instruction computation unit 31 (step S43), transmits a completion report (step S44), and completes the main memory access process. If the validity of access is admitted, the control device 61 turns the key protection exception signal off, and performs a process at step S44.

When a key check executed by the validity detection circuit 36 is not required, a completion report is transmitted to the CPU instruction computation unit 31 at the same time as the data transfer report, as shown in FIG. 4 (steps S44 and S46). In this case, the result of the key check is not referred to, and the process of the main memory access demand is not resumed after the registration of the storage key.

Next, with reference to FIGS. 6 to 12, the circuit arrangement of the CPU memory unit 32 of FIG. 2B is explained in detail for the case that a cache control as shown in FIG. 3 is carried out.

Figure 6:
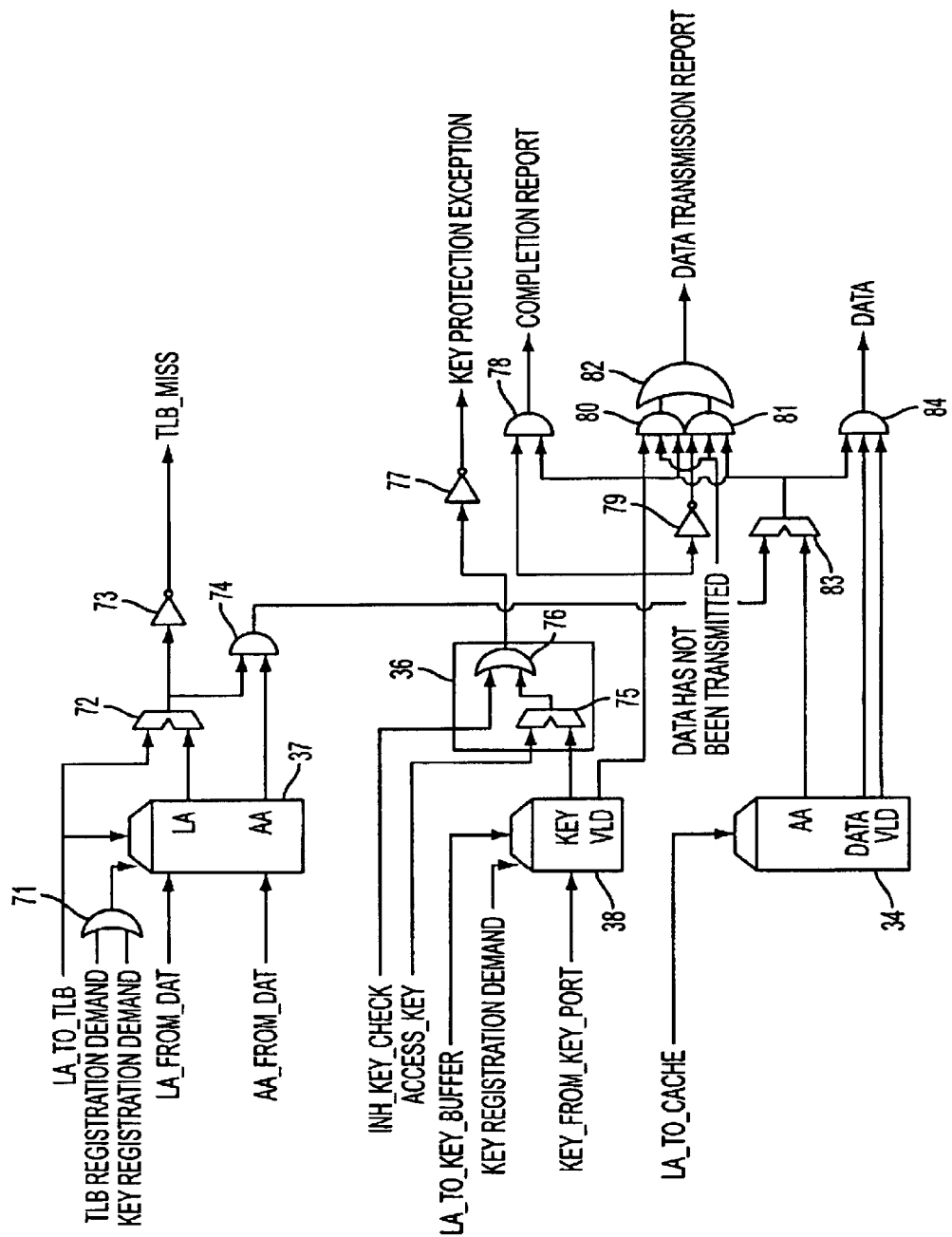
FIG. 6 is a block diagram showing the circuit of a CPU memory unit.

FIG. 6 shows the connection relation of circuits of the CPU memory unit 32. Inverters 77 and 79, AND gates 78, 80, and 81, and an OR gate 82 of FIG. 6 belong to the control device 61.

A signal LA_TO_TLB expresses or indicates a logical address transmitted from the control device 61 to TLB 37. A signal LA_FROM_DAT expresses or indicates a logical address output from DAT 39. A signal AA_FROM_DAT expresses or indicates a physical address output from DAT 39.

An OR gate 71 outputs to TLB 37, the OR operation of a TLB registration demand signal and a key registration demand signal, which are output from the control device 61. A comparator 72 compares the signal LA_TO_TLB and a logical address LA that is output from TLB 37, and it outputs a signal that turns on when the two agree. An inverter 73 reverses the output of the comparator 72, and generates a signal TLB_MISS that turns on for a TLB miss. An AND gate 74 outputs the AND operation of the output of the comparator 72 and a physical addresses AA that is output from TLB 37.

As mentioned above, a signal INH_KEY_CHECK is sent from the CPU instruction computation unit 31 to the CPU memory unit 32, and the signal turns on when key control protection is not required. A signal ACCESS_KEY expresses or indicates an access key that is sent from the CPU instruction computation unit 31 to the CPU memory unit 32. A signal LA_TO_KEY_BUFFER expresses a logical address that is sent from the control device 61 to the key buffer 38. A signal KEY_FROM_KEY_PORT shows a storage key that is output from the key access port 62.

The validity detection circuit 36 includes a comparator 75 and an OR gate 76. The comparator 75 compares the signal ACCESS_KEY and the storage key that is output from the key buffer 38, and it outputs a signal that turns on when the two agree. The OR gate 76 outputs the OR operation of the signal INH_KEY_CHECK and the output of the comparator 75. An inverter 77 reverses the output of the OR gate 76, and generates a key protection exception signal that turns off in the case that the transmitted data is effective.

A signal LA_TO_CACHE expresses the logical address that is sent from the control device 61 to the cache 34. A comparator 83 compares the output of the AND gate 74 and the physical address AA that is output from the cache 34, and it outputs a signal that turns on when the two agree. The AND gate 78 outputs the AND operation of a validity signal VLD that is output from the key buffer 38 and the output of the comparator 83, as a completion report.

The inverter 79 reverses the signal VLD to be output. The AND gate 80 outputs the signal VLD, the AND operation of the output of the comparator 83 and a data unsent signal. The AND gate 81 outputs the output of the inverter 79, and the AND operation of the output of the comparator 83 and a data unsent signal. The data unsent signal is on before data is transmitted, while the signal turns off once data is transmitted. The OR gate 82 outputs the OR operation of the outputs of the AND gates 80 and 81, as a data transfer report.

Further, the AND gate 84 outputs the output of the comparator 83, and the AND operation of the data (DATA) and the validity signal VLD which are output from the cache 34, as data.

According to such a circuit arrangement, data is immediately transmitted to the CPU instruction computation unit 31, if the physical address that is read out by the TLB hit agrees with the physical address of the corresponding cache 34. At the same time, a data transfer report is transmitted without considering whether a storage key is registered or stored in the key buffer 38. Further, a completion report is immediately transmitted when a storage key is registered in the key buffer 38 and the signal VLD becomes on.

Figure 7:
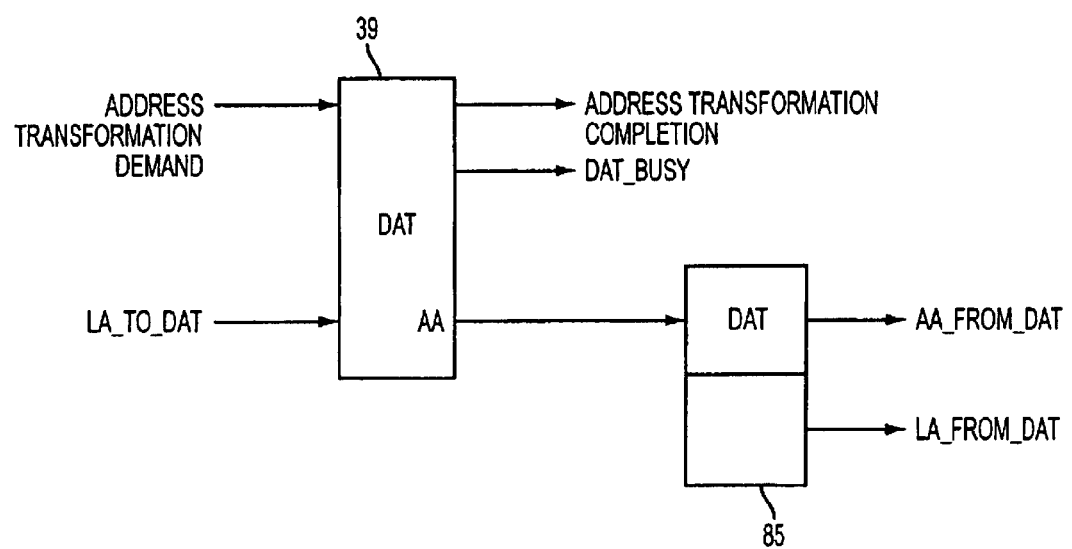
FIG. 7 is a block diagram showing the first input-output signal of DAT.

FIG. 7 shows an input-output signal of DAT 39. An address translation demand signal is output from the control device 61. A signal LA_TO_DAT shows the logical address that is sent from the control device 61 to DAT 39. DAT 39 transforms the signal LA_TO_DAT into a physical address AA when an address translation demand signal turns on to be output, and it turns an address translation completion signal on.

A physical address AA of the translation result is stored in a register 85 provided in the control device 61 to be output as a signal AA_FROM_DAT. At this time, even the signal LA_TO_DAT is stored in the register 85 to be output as a signal LA_FROM_DAT. A signal DAT_BUSY turns on during use of DAT 39, and turns off when the translation result is registered in TLB 37.

Figure 8:
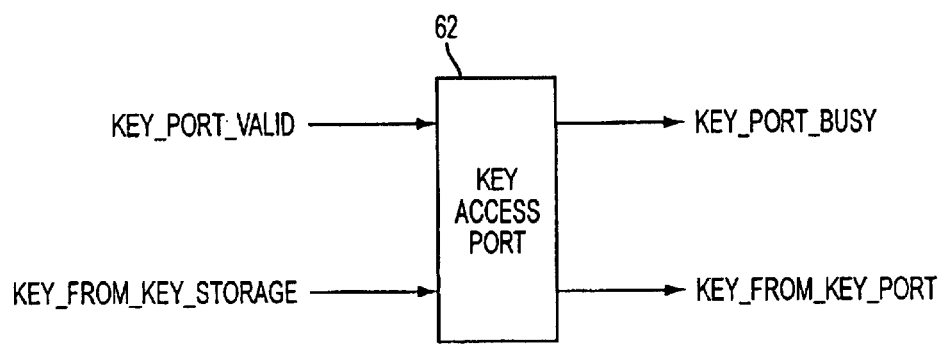
FIG. 8 is a block diagram showing the first input-output signal of a key access port.

FIG. 8 shows the input-output signal of the key access port 62. A signal KEY_PORT_VALID is output from the control device 61, and a signal KEY_FROM_KEY_STORAGE shows the storage key that is transmitted from the key storage 41. The key access port 62 outputs the key KEY_FROM_KEY_STORAGE as a signal KEY_FROM_KEY_PORT. A signal KEY_PORT_BUSY turns on during use of the key access port 62, while it turns off when the storage key is output.

Figure 9:
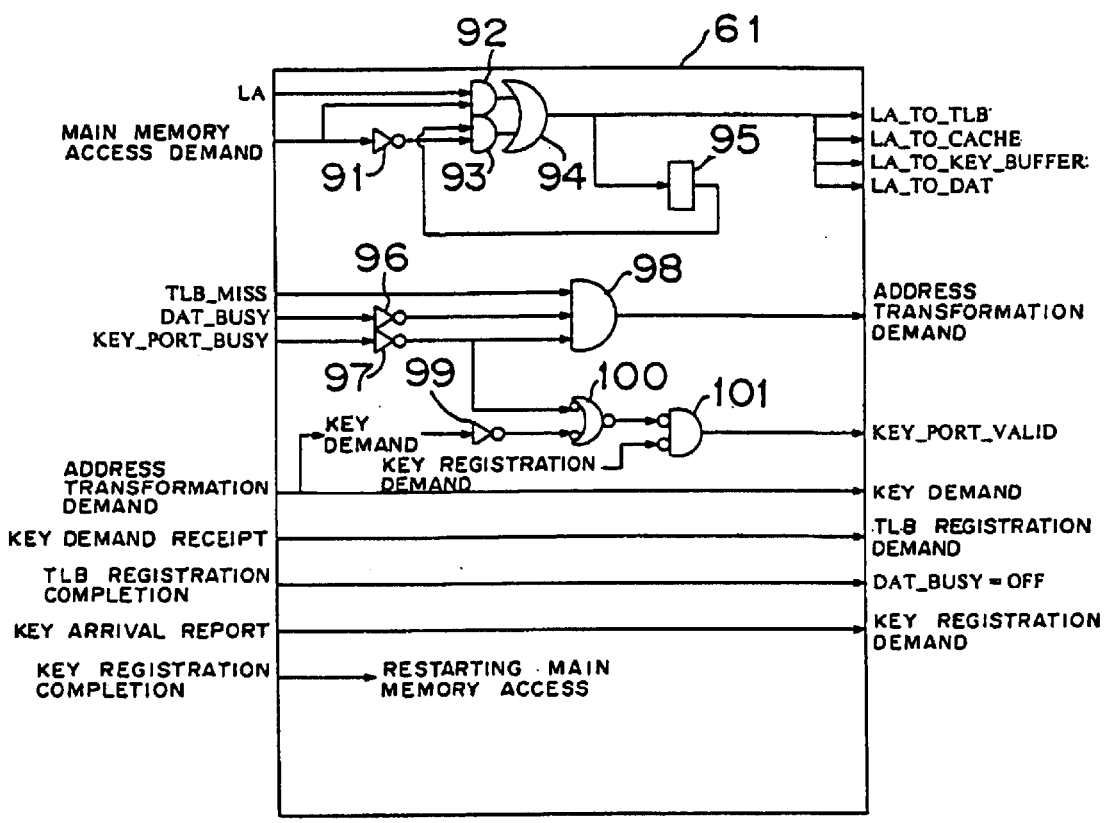
FIG. 9 is a block diagram showing the constitution of a control device.

FIG. 9 is a block diagram showing the arrangement of the control device 61. A signal LA shows the logical address that is transmitted from the CPU instruction computation unit 31. An inverter 91 reverses the main memory access demand signal output from the CPU instruction computation unit 31 to be output. An AND gate 92 outputs the AND operation of the logical address LA and the main memory access demand. An AND gate 93 outputs the AND operation of the output of an OR gate 94 that is stored in a register 95 and the output of the inverter 91. The OR gate 94 outputs the OR operation of the outputs of the AND gates 92 and 93, as signals LA_TO_TLB, LA_TO_CACHE, LA_TO_KEY_BUFFER, and LA_TO_DAT.

According to such a circuit arrangement, when the main memory access demand signal turns on, and the logical address is delivered, the delivered logical address is sent to each of TLB 37, the cache 34, the key buffer 38, and DAT 39. Even if the main memory access demand signal turns off after that, the logical address can be transmitted repeatedly since it is stored in the register 95.

Inverters 96 and 97 respectively reverse signals DAT_BUSY and KEY_PORT_BUSY to be output. An AND gate 92 outputs a signal TLB_MISS, and the OR operation of the outputs of the inverters 96 and 97, as an address translation demand.

Further, an address translation completion signal output from DAT 39 is output to the key storage 41 as a key demand signal. The key storage 41 that receives the key demand signal returns a key demand reception signal and this signal is then output as a TLB registration demand or storage signal. When the registration of the translation result executed by DAT 39 completes, TLB 37 outputs a TLB registration completion signal which turns a signal DAT_BUSY off, thereby releasing DAT 39.

According to such a circuit arrangement, a key demand is issued immediately after the completion of address translation. This issuance immediately triggers the TLB registration and the DAT release.

Further, a key arrival report signal output from the key storage 41 is output as a key registration demand signal. The key buffer 38 outputs a key registration completion signal when the registration of a storage key completes. The control device 61 resumes the process for a main memory access demand when it receives the key registration completion signal.

An inverter 99 reverses the key demand signal to be output. An OR gate 100 reverses the OR operation of the denials of the outputs of the inverters 97 and 99 to be output. An AND gate 101 outputs the AND operation of the output of the OR gate 100 and a key registration demand signal, as a signal KEY_PORT_VALID.

As stated previously, two data paths for instruction fetch and for operand fetch exist between the CPU instruction computation unit 31 and the CPU memory unit 32. Two TLBs 37, key buffers 38, and caches 34 are provided in the CPU memory unit 32 corresponding to two data paths. Therefore, DAT 39 needs to recognize from which of the instruction fetch and the operand fetch an address translation demand is issued.

Figure 10:
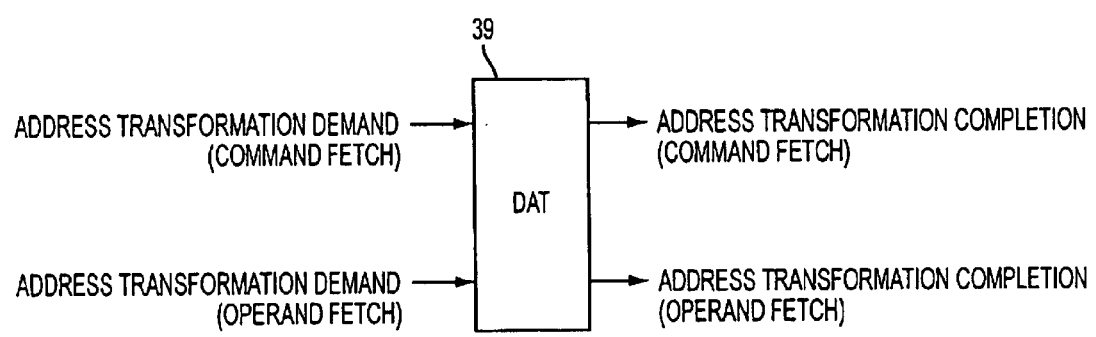
FIG. 10 is a diagrammatic illustration of the second input-output signal of DAT.
Figure 11:
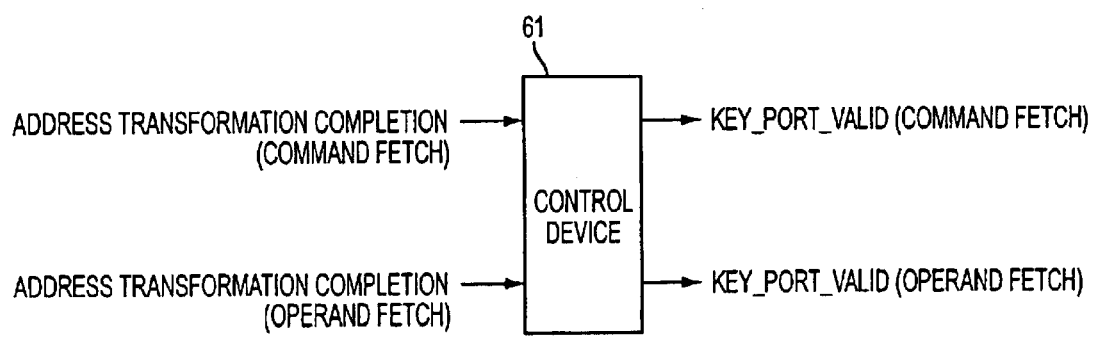
FIG. 11 is a diagrammatic illustration of an input-output signal of the control device.

Thereupon, DAT 39 receives an address translation demand signal for each of instruction fetch and operand fetch, and outputs an address translation completion signal as shown in FIG. 10. The control device 61 generates a signal KEY_PORT_VALIDITY for each of the instruction fetch and the operand fetch as shown in FIG. 11.

Figure 12:
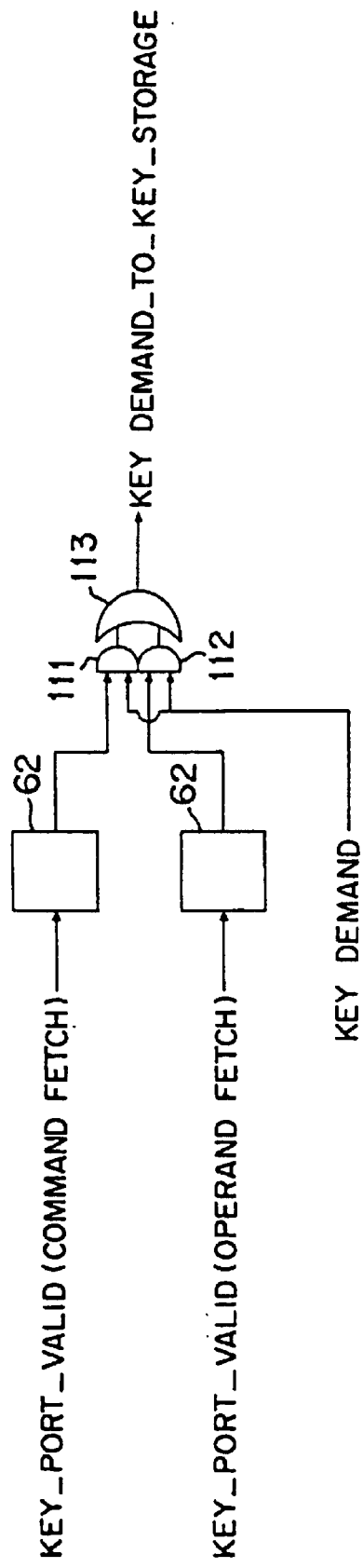
FIG. 12 is a block diagram showing the second input-output signal of the key access port.

In this case, one of the two key access ports 62 is used for instruction fetch, while the other is used for operand fetch as shown in FIG. 12. The key access ports 62 receive a signal KEY_PORT_VALID regarding the instruction fetch or the operand fetch, and outputs a signal KEY_PORT_BUSY.

An AND gate 111 outputs the AND operation of the signal KEY_PORT_BUSY and a key demand signal which are output from the key access port 62 used for instruction fetch. An AND gate 112 outputs the AND operation of the signal KEY_PORT_BUSY and a key demand signal which are output from the key access port 62 used for operand fetch. Then, an OR gate 113 transmits the OR operation of the outputs of AND gates 111 and 112 to the key storage 41 as a key demand signal_TO_KEY_STORAGE.

The following explanation is for the case where two key access ports 62 are provided, but generally two or more key access ports 62 can be included. As the number of key access ports 62 increases, many key accesses can be simultaneously processed.

Next, the characteristics of the cache control of the present invention are added in reference to FIGS. 13 to 17.

Figure 13:
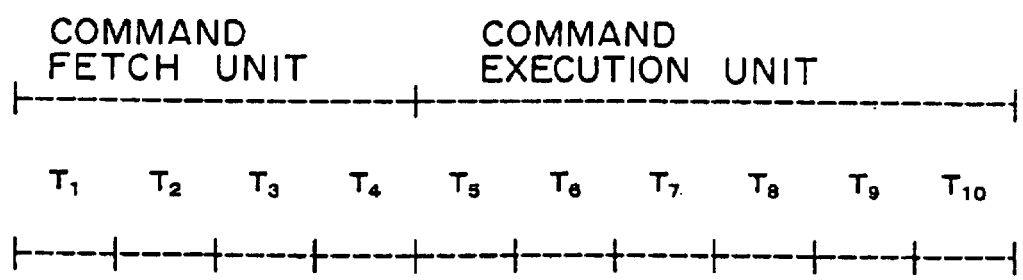
FIG. 13 is a diagrammatic illustration of the stage of an instruction process.

In the implementation of an instruction, it is assumed that there are a plurality of stages as shown in FIG. 13. In this case, the action is carried out according to the following procedures, in order that CPU implements one instruction.

(1) Instruction Fetch Unit
T1: Generating an instruction address
T2: Transforming the instruction address (virtual address→physical address)
T3: Reading out an instruction for the instruction address
T4: Checking and decoding an operation code.
(2) Instruction Execution Unit
T5: Generating an operand address
T6: Transforming the operand address
T7: Reading out the operand
T8: Execution
T9: Checking the result
T10: Writing the result in a register or a memory device.

Figure 14:
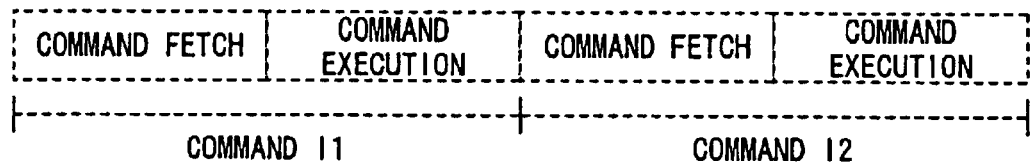
FIG. 14 illustrates single control.
Figure 15:
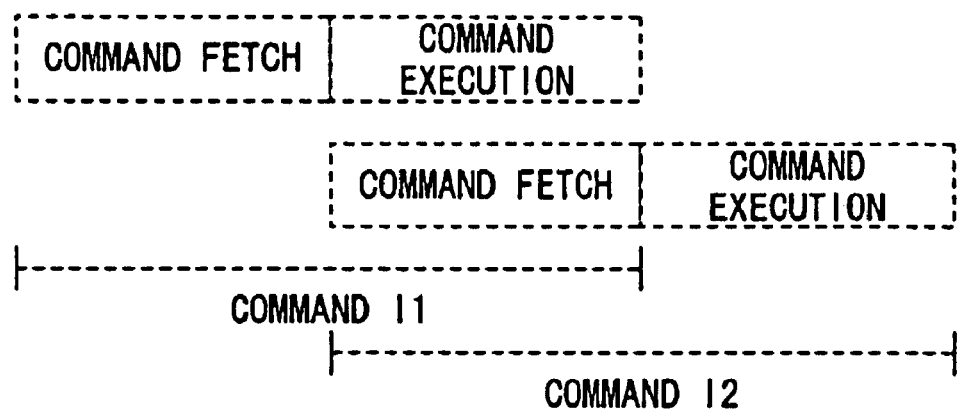
FIG. 15 illustrates pipeline control.

When such procedures are controlled with a single flow, the fetch of the following instruction 12 is carried out after the implementation of the preceding instruction 11 terminates, as shown in FIG. 14. A method of speeding up the process of successive instructions called, pipeline control as shown in FIG. 15 is well known. According to the pipeline control approach, the fetch of instruction 12 can be started immediately after the fetch of instruction 11 terminates.

In this case, the implementation of instruction 11 and the fetch of instruction 12 are carried out simultaneously, so that the respective pieces of hardware are required. That is, for the address translation and the reading out of data that exist in both of the instruction fetch and the instruction execution, respective hardware is required. Because of this, TLBs, cache devices and other devices are respectively provided in the information processing unit of FIG. 2B.

For a DAT, however, the amount of necessary hardware greatly increases, thereby increasing the circuit scale when a table for address translation is provided with each cache. Thereupon, the instruction fetch and the operand fetch share one DAT in the present preferred embodiments.

Figure 16:
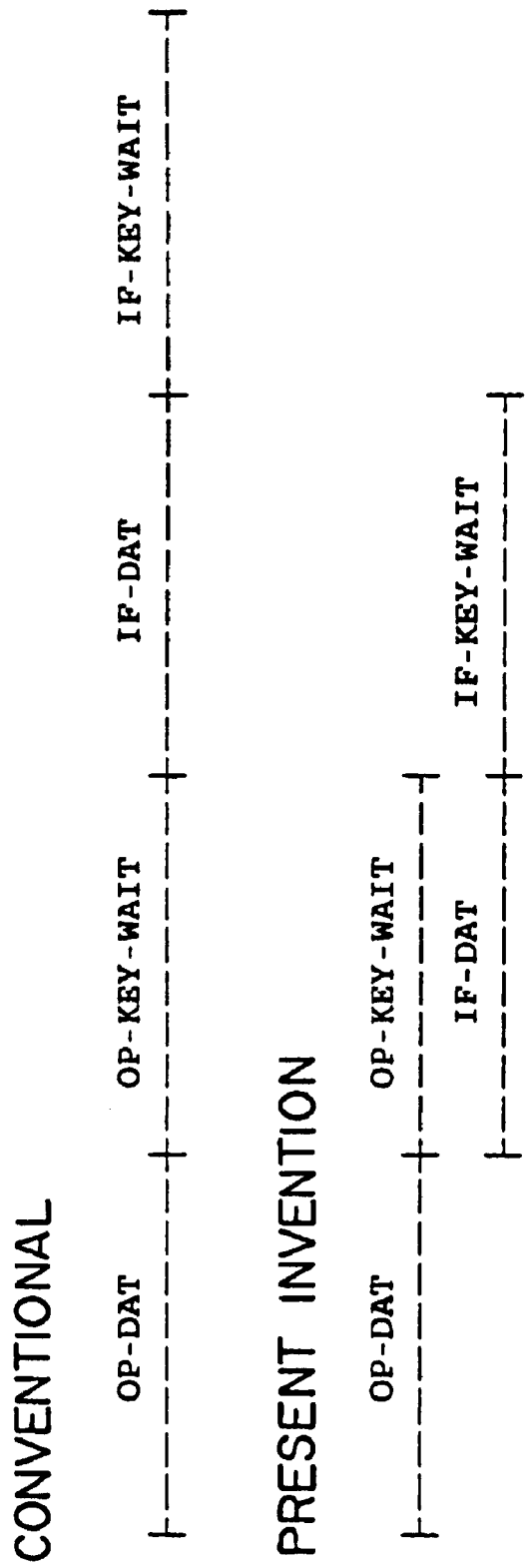
FIG. 16 is a diagrammatic illustration of DAT release.

When a conventional control method used for DAT and the control method of the present invention used for DAT are compared based on the above-mentioned arrangement, the results are as shown in FIG. 16. When a TLB miss occurs by the instruction fetch after a TLB miss occurs by the operand fetch, a key access (OP-KEY-WAIT) of the operand fetch is carried out following the translation (OP-DAT) of an operand address by DAT, in the conventional control method. Next, the DAT is released after the arrival of a storage key, and the translation of an instruction address by DAT (IF-DAT) as well as a key access of the instruction fetch (IF-KEY-WAIT) are carried out.

In the control method of the present invention, in contrast, the DAT is released immediately after the translation OP-DAT, and the accesses OP-KEY-WAIT and IF-DAT are carried out simultaneously, thereby speeding up the whole process.

Figure 17:
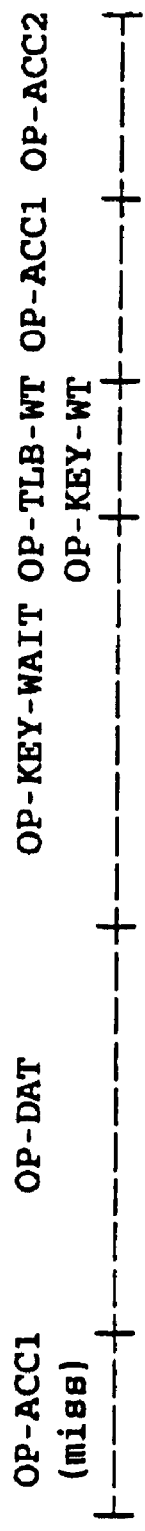
FIG. 17 is a diagrammatic illustration of TLB registration.
Figure 17:
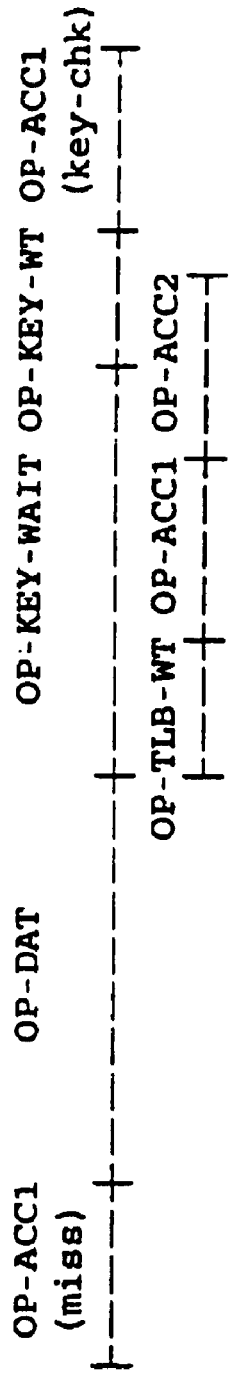

When the conventional control method and the control method of the present invention, which are used for TLB registration, are compared, the results are as shown in FIG. 17. In the case that a TLB miss (OP-ACC1) occurs by operand fetch, the access OP-KEY-WAIT is carried out following the translation OP-DAT, and the registration of the address translation result in TLB (OP-KEY-WT) and the registration of a storage key in the key buffer (OP-TLB-WT) are carried out after the arrival of the storage key, in the conventional control method. Next, the process of operand fetch (OP-ACC1) is resumed, a TLB hit occurs, and the next operand fetch (OP-ACC2) is started.

In the control method of the present invention, in contrast, the registration OP-TLB-WT is carried out immediately after the translation OP-DAT. Therefore, the process OP-ACC1 and the operand fetch OP-ACC2 can be started between the registration OP-KEY-WAIT.

According to the present invention, the access to instructions and operands are made efficiently. In the information processing unit provided with key control protection using a storage key.

Especially, in the data transfer processing to a CPU instruction computation unit, a key access is executed and then data is transmitted, according to the conventional method. In the present invention, in contrast, data is transmitted during the data access, thereby shortening the time required for the data transfer process. Further regarding a demand which does not require key control protection, the time required for a data transfer process can be similarly shortened, since data is transmitted and a completion report is issued during a key access.

In a TLB registration process, TLB registration is conventionally executed after a key access is carried out, while in the present invention, TLB registration is executed during a key access. Therefore, TLB can be referred to without waiting for the execution of the preceding demand that is being key-accessed, when a successive demand refers to TLB in the super-scalar processor for performing an out-of-order process. The executing time can be shortened.

In a DAT release process, conventionally, the DAT is released after a key access has been executed, while in the present invention, the DAT is released while a key access is being executed. Therefore, the DAT can be activated for a successive DAT demand without waiting for the process of the preceding demand that is being key-accessed, in the super-scalar processor for performing an out-of-order process. Consequently, the time required for an address translation process can be shortened and the increase in a scale of a circuit scale can be restrained, at the same time.

Furthermore, by preparing a plurality of key access ports, the successive key accesses can be executed while the preceding key access is carried out. Accordingly, the address translation processes executed by DAT and a series of key access processes can be continuously executed, thereby shortening the processing time.

What is claimed is:

1. An apparatus for controlling a cache memory that stores data, said apparatus provided with protection via a storage key to permit access to data stored in the cache, said apparatus comprising:

a translation lookaside buffer device registering a correspondence relation between a logical address and a physical address;

an address translation device transforming a logical address of the access into a physical address when the logical address of the access is not registered in the translation lookaside buffer device;

a requesting device that requests the storage key;

a control device that registers a translation result of the logical address of the access in the translation lookaside buffer device and initiates a search of the translation lookaside buffer device and a retrieval of the data in the cache without waiting for the requested storage key to be received, thereby enables a search of the translation lookaside buffer device for a successive data access without waiting for the requested storage key to be received; and a transfer device that transmits the data retrieved from the cache.

2. The apparatus according to claim 1, wherein the transfer device transmits the retrieved data without waiting for arrival of the demanded storage key.

3. The apparatus according to claim 1, further comprising:

a translation lookaside buffer device registering a correspondence relation between a logical address and a physical address; and an address translation device transforming the logical address into the physical address, wherein when a logical address of the access is not registered in the translation lookaside buffer device, the control device demands translation of the logical address of the access from the address translation device, registers the translation result of the logical address of the access in the translation lookaside buffer device, and releases the address translation device without waiting for arrival of the demanded storage key.

4. The apparatus according to claim 3, further comprising a plurality of key access ports storing an arrived storage key, wherein the address translation device translates a plurality of logical addresses associated with a plurality of accesses, and the demand device demands a corresponding storage key each time translation completes.

5. The apparatus according to claim 1, wherein the control device completes an access process for an access that does not require the key control protection, without waiting for arrival of the demanded storage key.

6. An apparatus as recited in claim 1, wherein the transfer device transfers the data retrieved from the cache to an instruction processor without waiting for arrival of the requested storage key.

7. A cache control method used for a data processing device provided with key control protection using a storage key for an access to data, comprising:

searching a translation lookaside buffer for a logical address of the access;

transforming the logical address of the access into a physical address when the logical address of the access is not registered in the translation lookaside buffer device;

requesting the storage key;

registering a translation result of the logical address in the translation lookaside buffer;

initiating a retrieval search of the translation lookaside buffer again, without waiting for receipt of the requested storage key thereby enabling a search of the translation lookaside buffer device for a successive data access without waiting for the requested storage key to be received; and transmitting data stored in a cache corresponding to the logical address.

8. An apparatus as recited in claim 7, wherein the transferring transfers the data retrieved from the cache to an instruction processor without waiting for arrival of the requested storage key.

9. An cache control device used for a data processing device provided with key control protection using a storage key for an access to data, comprising: cache means for storing the data;

translation lookaside means for storing a correspondence between a logical address and a physical address request means for requesting the storage key;

control means for initiating a retrieval of the data in the cache means without waiting for receipt of the requested storage key thereby enabling a search of the translation lookaside means for a successive data access without waiting for the requested storage key to be received, thereby enabling a search of the translation lookaside buffer device for a successive data access without waiting for the requested storage key to be received; and transfer means for transmitting the retrieved data.

10. An apparatus as recited in claim 9, wherein the transfer means transfers the data retrieved from the cache to an instruction processor without waiting for arrival of the requested storage key.

* * * * *

UNITED STATES PATENT AND TRADEMARK OFFICE
CERTIFICATE OF CORRECTION

PATENT NO. : 6,883,077 B2
DATED : April 19, 2005
INVENTOR(S) : Hiroaki Kimura et al.

It is certified that error appears in the above-identified patent and that said Letters Patent is hereby corrected as shown below:

Column 12,
Line 42, change "An" to -- A --.

Signed and Sealed this

Tenth Day of January, 2006

JON W. DUDAS
*Director of the United States Patent and Trademark Office*